United States Patent
Meilinger et al.

(10) Patent No.: US 10,574,392 B2
(45) Date of Patent: Feb. 25, 2020

(54) SYSTEM. METHODS AND DEVICES FOR TRANSMITTING AND/OR RECEIVING DATA USING AN INTER COMMUNICATION LINK

(71) Applicant: Airbus Defence and Space GmbH, Taufkirchen (DE)

(72) Inventors: Jürgen Meilinger, Wolnzach (DE); Ulrich Schneider, Sulzberg (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 162 days.

(21) Appl. No.: 15/724,150

(22) Filed: Oct. 3, 2017

(65) Prior Publication Data

US 2018/0048424 A1    Feb. 15, 2018

Related U.S. Application Data

(63) Continuation of application No. PCT/DE2016/000152, filed on Apr. 12, 2016.

(30) Foreign Application Priority Data

Apr. 14, 2015    (DE) .................. 10 2015 004 580

(51) Int. Cl.
*H04L 1/00* (2006.01)
*G06F 11/08* (2006.01)
(Continued)

(52) U.S. Cl.
CPC ............ *H04L 1/0061* (2013.01); *G06F 11/08* (2013.01); *G06F 13/42* (2013.01);
(Continued)

(58) Field of Classification Search
None
See application file for complete search history.

(56) References Cited

U.S. PATENT DOCUMENTS

| 5,093,910 A | 3/1992 | Tulpule et al. |
| 6,191,614 B1 * | 2/2001 | Schultz ................. H03M 13/09 326/38 |

(Continued)

FOREIGN PATENT DOCUMENTS

EP    2348488 A1    7/2011

OTHER PUBLICATIONS

Koopman et al. "Tutorial: Checksum and CRC Data Integrity Techniques for Aviation" Carnegie Mellon University, May 9, 2012 (Year: 2012).*

(Continued)

*Primary Examiner* — Cynthia Britt
(74) *Attorney, Agent, or Firm* — Lorenz & Kopf LLP

(57) ABSTRACT

A method for the transmission of data via an Inter Communication Link (ICL) to a receiver unit is provided. The method identifies data to be transmitted in a memory cell of a data storage. The method continues by extracting the address of the memory cell and extracting the data word from the identified data. The method continues by calculating a CRC (cyclic redundancy check) checksum from the extracted address of the memory cell and the extracted data word. The method continues by generating a data packet to be sent by appending a start frame delimiter and a stop frame delimiter to the extracted address of the memory cell, the extracted data word and the calculated CRC checksum. The method continues by sending the data packet.

16 Claims, 6 Drawing Sheets

(51) Int. Cl.
*G06F 13/42* (2006.01)
*G06F 21/64* (2013.01)
(52) U.S. Cl.
CPC .......... *G06F 13/4213* (2013.01); *G06F 21/64* (2013.01); *H04L 1/0041* (2013.01); *H04L 1/0045* (2013.01)

(56) References Cited

U.S. PATENT DOCUMENTS

| | | | |
|---|---|---|---|
| 6,941,396 B1 | 9/2005 | Thorpe et al. | |
| 7,082,563 B2* | 7/2006 | Gemelli ............... | H03M 13/091 |
| | | | 714/758 |
| 7,295,574 B1* | 11/2007 | Parruck ............... | H04L 12/5601 |
| | | | 370/474 |
| 7,810,013 B2* | 10/2010 | Bains .................. | G06F 11/1004 |
| | | | 711/140 |
| 8,571,021 B2* | 10/2013 | Nemeth ................ | H04L 1/0083 |
| | | | 370/389 |
| 9,170,875 B2* | 10/2015 | Mueller .............. | G06F 11/1048 |
| 2014/0281844 A1* | 9/2014 | Jiang .................. | H03M 13/091 |
| | | | 714/807 |

OTHER PUBLICATIONS

"RS-232", Wikipedia, the free encyclopedia, from wikipedia.org website [online] [retrieved on Dec. 28, 2017], 6 pages. Retrieved from <URL: https://web.archive.org/web/20150322034112/http://en.wikipedia.org/wiki/RS-232>.
The German Patent and Trademark Office, Office Action for German Patent Application No. 10 2015 004 580.6 dated Jan. 29, 2016.

\* cited by examiner

SYSTEM. METHODS AND DEVICES FOR TRANSMITTING AND/OR RECEIVING DATA USING AN INTER COMMUNICATION LINK

CROSS-REFERENCE TO PRIORITY APPLICATIONS

This application is a continuation of international patent application number PCT/DE2016/000152, having an international filing date of Apr. 12, 2016, which claims priority to German patent application number 102015004580.6, having a filing date of Apr. 14, 2015. The content of these referenced applications is incorporated by reference herein.

TECHNICAL FIELD

Embodiments of the subject matter described herein relate generally to a method for transmitting data via an Inter Communication Link (ICL) to a receiving unit, and a method for receiving data transmitted via an ICL from a transmitting unit, as well as devices for transmitting data via an ICL.

BACKGROUND

The Inter Communication Link (ICL) is a communication interface for the data exchange between process nodes. The ICL is provided, for example, in the aircraft on the one hand for communication within a flight control computer (FCC) or Flight management computer (FMC) between several processing units, which compute data in so-called lanes. The ICL is then referred to as ILDL (Intra Lane Data Link). The ICL, on the other hand, is intended for communication between several flight control computers, each of which is divided into channels. The ICL is then also referred to as CCDL (Cross Channel Data Link). The ICL uses a reflective memory as a communication principle. Reflective memory networks have been developed to provide highly deterministic, precisely time-matched performance for distributed systems. Data streams between multiple FCCs or between an FCC and an FMC are often asynchronous. For safety reasons, the flight control computers or flight management computers are designed in duplicate or multiple redundant in an aircraft. When data are transferred via an ICL, which is certified by the civilian authorities, compliance with and proof of processes are additional major factors.

BRIEF SUMMARY

Based on that, an embodiment of the invention provides a method which reliably transmits or receives asynchronous data streams.

Certain objectives and advantages are achieved by a method having the features of claim 1 and a method having the features of claim 6. Exemplary embodiments are shown in the dependent claims. It should be noted that the features of the embodiments of the method for transmitting data also apply to embodiments of the method for receiving data, the transmitting unit, the receiving unit, as well as the computer system and the use of the computer system in an aircraft, and vice versa.

A method is provided for transmitting data via an ICL (Inter Communication Link) to a receiving unit, which comprises the step of identifying data to be transmitted in a memory cell of a data storage. The method further comprises the step of extracting the address of the memory cell and extracting the data word from the identified data. Further, the method comprises the step of calculating a CRC (cyclic redundancy check) checksum from the extracted address of the memory cell and the extracted data word. The method further comprises the step of generating a data packet to be sent by appending a start frame delimiter and a stop frame delimiter to the extracted address of the memory cell, the extracted data word, and the calculated CRC checksum. The method further comprises the step of sending the data packet.

The ICL (Inter Computer Link) transmits data from a storage of a transmitting station via a serial data line to the storages of the connected receiving stations to the same memory address as in the transmitting part. CRC (cyclic redundancy check) is a method for determining a check value for data to detect errors during transmission or storage.

When data in the transmitting part is written into the memory area corresponding to the ICL memory via a parallel data bus, the address of the memory cell and the data word are extracted. A CRC checksum is calculated from the extracted address of the memory cell and the data word and is supplemented with a start frame delimiter and a stop frame delimiter and sent as a packet.

The disclosed subject matter is based on the idea of providing a temporally deterministic transmission of memory contents in order to enable the data exchange of synchronously calculating but distributed processors with a relatively high data rate. By dispensing with compression and the simple juxtaposition of information, the transmission is reviewable and verifiable with simple means. This is made possible by full definition, implementation and proof. In particular, the present implementation and traceability of data transmission makes certifiability possible.

According to an embodiment of the method, the logical value "1" is continuously transmitted as long as no data packet is sent. As long as no accesses in the transmitting part to the ICL memory occur, serial "1" are continuously transmitted on the serial data line. This has the advantage that a deterministic transmission with low latency is achieved.

According to an embodiment of the method, the start frame delimiter includes or consists of a sequence of three Manchester II half bits with the value "1" and/or the stop frame delimiter includes or consists of a sequence of three Manchester II half bits with the value "0". The start frame delimiter includes or consists of a sequence of three Manchester half bits with the value "1", which allows an unambiguous detection of the start frame delimiter. The end frame delimiter includes or consists of a sequence of three Manchester II half bits with the value "0". The Manchester code is a line code which receives the clock signal during encoding. In this case, a bit sequence modulates binary the phasing of a clock signal. For one half bit, one bit is divided into two halves. According to one embodiment, the first half bit is identical to the data bit, and the second half bit is the complement of the data bit. In an alternative embodiment, the first half bit is the complement of the data bit, and the second half bit is identical to the data bit.

According to an embodiment of the method, the logical value "1" is transmitted during a sequential transmission of data packets between the stop frame delimiter of the first data packet and the start frame delimiter of the subsequent data packet. When a plurality of data words is subsequently transmitted, a "1" is sent between the end frame delimiter of a packet and the start frame delimiter of the next packet. This has the advantage that a deterministically verifiable transmission time is achieved by a sequential transmission.

According to an embodiment of the method, the data packets are transmitted by a Manchester II code. The data transmission uses the Manchester II code for transmission. This has the advantage that the emission bandwidth is limited.

In an exemplary embodiment of the method, the signal rate on the serial data line is, for example, 40 Mbit/s for Manchester II half bits. In the illustrated example, the memory addresses can be transmitted with, for example, 12 bits, the data words are transmitted, for example, with 32 bits, and the CRC is transmitted, for example, with 8 bits. In the case of the example of the method illustrated here, a usage data rate of somewhat more than 1.4 Mbytes/s is obtained with continuous data transmission. However, the method is not limited to the example illustrated here. The example shown here is merely illustrative of the method described herein.

Further, a method is provided for receiving data via an ICL, from a transmitting unit, wherein the method comprises the step of receiving a data packet. The method further comprises verifying the validity of the received packet based on the length between a start frame delimiter and a stop frame delimiter of the data packet. The method further comprises extracting a CRC checksum, an address of a memory cell, and a data word from the data packet. The method further comprises calculating a CRC checksum from the extracted address of the memory cell and the extracted data word. Further, the method comprises comparing the calculated CRC checksum with the extracted CRC checksum. The method further comprises writing the extracted data word to the extracted address of the memory cell in a data storage when the calculated CRC checksum matches the extracted. CRC checksum.

The receiving part recognizes the packet at the start frame delimiter and checks the validity of the packet based on the length between the start and stop frame delimiter. The contained address and the data word as well as the CRC are decoded. The CRC from the address and the data word is calculated by the receiving part and compared with the received CRC. If the calculated CRC and the received CRC are equal, then the received data word is written into the memory of the receiving part to the decoded address and is available there for access via a parallel data bus.

According to an embodiment of the method, the extracted data word is discarded if the calculated CRC checksum does not match the extracted CRC checksum. The verification of the CRC has the advantage that errors in the transmission of the data can be detected more easily.

According to an embodiment of the method, an error counter is incremented if the calculated CRC checksum does not match the extracted CRC checksum. If the calculated CRC and the received CRC are different, then the received data is discarded and an error counter is incremented. This has the advantage that errors in the transmission of the data can be detected more easily.

According to an embodiment of the method, the address of the memory cell of the receiving unit is identical to the address of the memory cell of the transmitting unit. This has the advantage that the further upstream or downstream methods for processing the data to be transmitted can be simplified.

Further, a transmitting unit for the transmission of data via an ICL to a receiving unit is provided, wherein the transmitting unit comprises a processor which is configured to identify data to be transmitted in a memory cell of a data storage. The processor is further configured to extract the address of the memory cell and the data word from the identified data. Further, the processor is configured to calculate a CRC from the extracted address of the memory cell and the extracted data word. The processor is further configured to generate a data packet to be transmitted by appending a start frame delimiter and a stop frame delimiter to the extracted address of the memory cell, the extracted data word, and the calculated CRC. The transmitting unit further comprises a transmitter configured to send the data packet.

Further, a receiving unit for the receiving of data via an ICL from a transmitting unit is provided, wherein the receiving unit comprises a receiver configured to receive a data packet. The receiving unit further comprises a processor which is configured to check the validity of the received packet based on the length between a start frame delimiter and a stop frame delimiter of the data packet. The processor is further configured to extract a CRC, an address of a memory cell, and a data word from the data packet. Further, the processor is configured to calculate a CRC from the extracted address of the memory cell and the extracted data word. The processor is further configured to compare the calculated CRC with the extracted CRC. Further, the processor is configured to write the extracted data word to the extracted address of the memory cell in a data store device if the calculated CRC matches the extracted CRC.

The processor of the transmitting unit and/or the processor of the receiving unit can be, for example, a DAL-A and/or DAL-B safety-certified processor. For example, five safety levels, also known as DAL (Design Assurance Level) stages DAL A to DAL E, are used in aviation. The various levels are defined by a directive on the certification of avionics software. Here, DAL-A means "catastrophic" effects—on the aircraft in the event of a failure—to DAL-E "no effects". Depending on the functions that a software or a hardware is to perform, it can endanger the safety of the aircraft more or less. Depending on the hazardous effects, different requirements are set on the development process. However, only a limited number of processors are available as DAL-A and/or DAL-B. For example, the use of multicore processors for a DAL-A or DAL-B critical use is generally very limited or not possible, since these processors do often have not or only very limited the required safety, predictability and the required determinism. According to an embodiment, the processor of the transmitting unit and/or the processor of the receiving unit is a FPGA (Field Programmable Gate Array) processor. FPGA processors for DAL-A or DAL-B critical applications are available, but have a considerable lower processing power compared to current multicore processors.

Furthermore, a computer system comprising at least one previously described transmitting unit for connecting the computer system with at least one further computer system is provided.

According to an embodiment, the computer system comprises at least one receiving unit described above.

According to an embodiment, the communication of the computer system with the second computer system is carried out via an optical or electrical signal line.

Further, an aircraft is provided which comprises at least one first computing unit and one second computing unit. The first computing unit comprises at least one previously described transmitting unit. The second computing unit comprises at least one previously described receiving unit. The aircraft further comprises a data network, wherein the transmitting unit of the first computing unit is configured to transmit data via the data network to the receiving unit of the second computing unit.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

In the drawings, same reference numerals generally refer to the same parts throughout the several views. The drawings are not necessarily true to scale; emphasis is instead generally set forth to illustrate the principles of the disclosed subject matter. In the following description, various embodiments of the invention will be described with reference to the following drawings in which.

DETAILED DESCRIPTION

Figure 1:
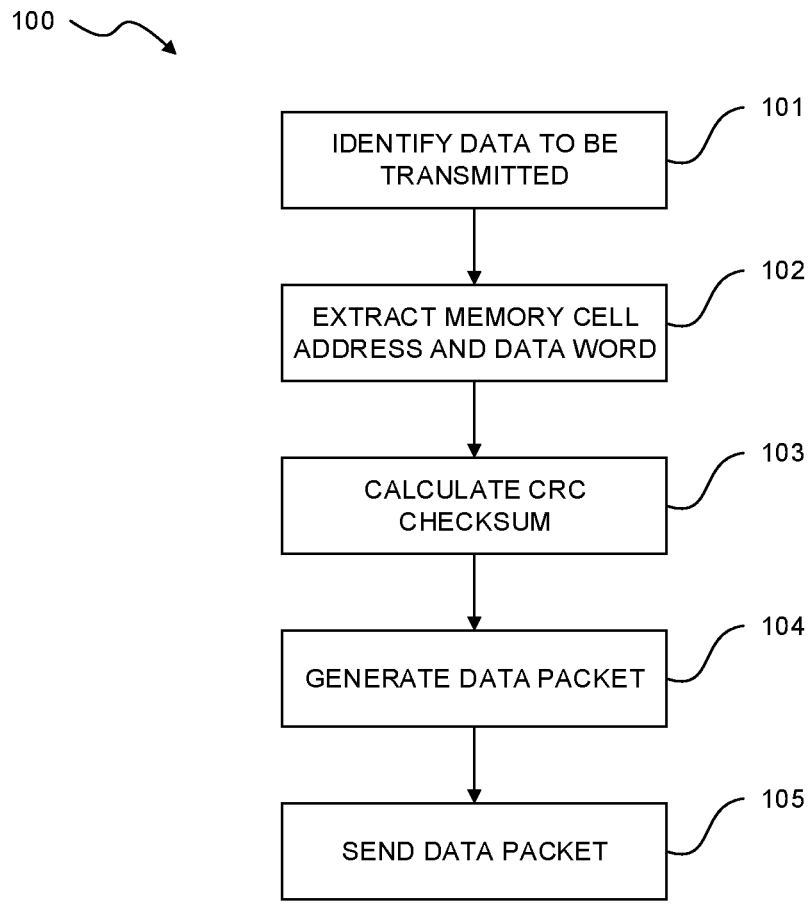
FIG. 1 is a flowchart showing an embodiment of the method for transmitting data.

The following detailed description makes reference to the attached drawings, which show, by way of illustration, specific details and embodiments in which the invention may be practiced.

The word "exemplary" is used herein with the meaning "serving as an example, case or illustration". Any embodiment or configuration described herein as "exemplary" is not necessarily to be construed as being preferred or advantageous with respect to other embodiments or configurations.

In the following detailed description, reference is made to the accompanying drawings which form part hereof, and in which are shown by way of illustration specific embodiments in which the invention may be practiced. In this regard, directional terminology such as "top", "bottom", "front", "rear", "front", "rear", etc. is used with reference to the orientation of the described figure(s). Since components of embodiments can be positioned in a number of different orientations, the directional terminology is illustrative and is not in any way limiting. It is to be understood that other embodiments may be used and structural or logical changes may be made without departing from the scope of the present invention. It is to be understood that the features of the various exemplary embodiments described herein may be combined with each other, unless specifically specified otherwise.

The following detailed description, therefore, is not to be construed in a limiting sense, and the scope of the present invention is defined by the appended claims.

Within the scope of this description, the terms "connected" and "coupled" are used to describe both a direct and an indirect connection, a direct or indirect connector as well as a direct or indirect coupling. In the figures, identical or similar elements are provided with identical reference numerals, as far as this is appropriate.

In FIG. 1, a flowchart of an embodiment of the method 100 for transmitting data via an ICL to a receiving unit is shown by way of example. In step 101, data to be transmitted are identified in a memory cell of a data storage. In step 102, the address of the memory cell and the data word are extracted from the identified data. In step 103, a CRC checksum is calculated from the extracted address of the memory cell and the extracted data word. In step 104, a data packet to be sent is generated by appending a start frame delimiter and a stop frame delimiter to the extracted address of the memory cell, the extracted data word, and the calculated CRC checksum. In step 105, the generated data packet is sent.

In a further non-illustrated embodiment of the method for transmitting data, the logical value "1" is continuously transmitted in a further step, as long as no data packet is sent. The start frame delimiter preferably consists of a sequence of three Manchester II half bits having the value "1" and/or the stop frame delimiter preferably consists of a sequence of three Manchester II half bits with the value "0". Preferably, in the case of a sequential transmission of data packets between the stop frame delimiter of the first data packet and the start frame delimiter of the subsequent data packet, the logical value "1" is transmitted. Preferably, the data packets are transmitted by a Manchester II code.

Figure 2:
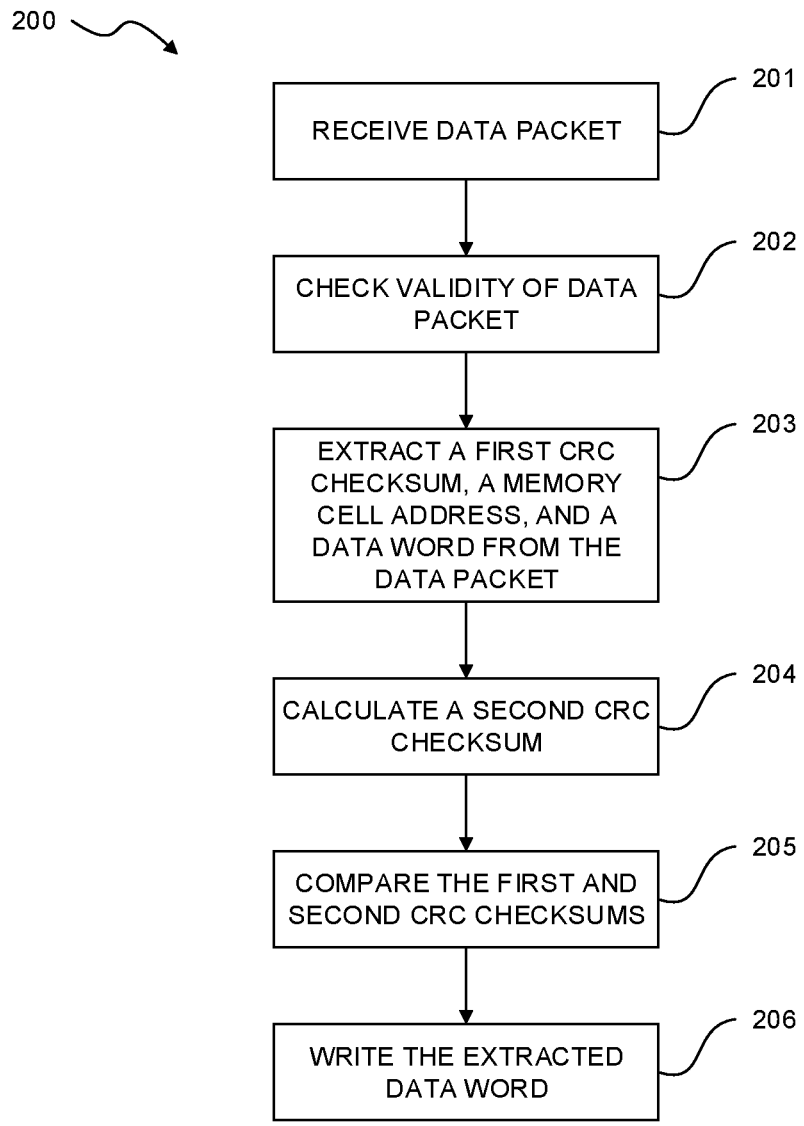
FIG. 2 is a flowchart showing an embodiment of the method for receiving data.

FIG. 2 shows, by way of example, a flow diagram of an embodiment of the method 200 for receiving data via an ICL from a transmitting unit. In step 201, a data packet is received. In step 202, the validity of the received packet is checked based on the length between a start frame delimiter and a stop frame delimiter of the data packet. In step 203, a CRC checksum, an address of a memory cell, and a data word are extracted from the data packet. In step 204, a CRC checksum is calculated from the extracted address of a memory cell and the extracted data word. In step 205, the calculated CRC checksum is compared with the extracted CRC checksum from the received data packet. In step 206, the extracted data word is written to the extracted address of the memory cell in a data storage if the calculated CRC checksum matches the extracted CRC checksum.

In a further non-illustrated embodiment of the method for receiving data, in a further step, the extracted data word is discarded if the calculated CRC checksum does not match the extracted CRC checksum. If the calculated CRC checksum does not match the extracted CRC checksum, an error counter is further incremented. The address of the memory cell of the receiving unit is, in this case, preferably identical to the address of the memory cell of the transmitting unit.

Figure 3:
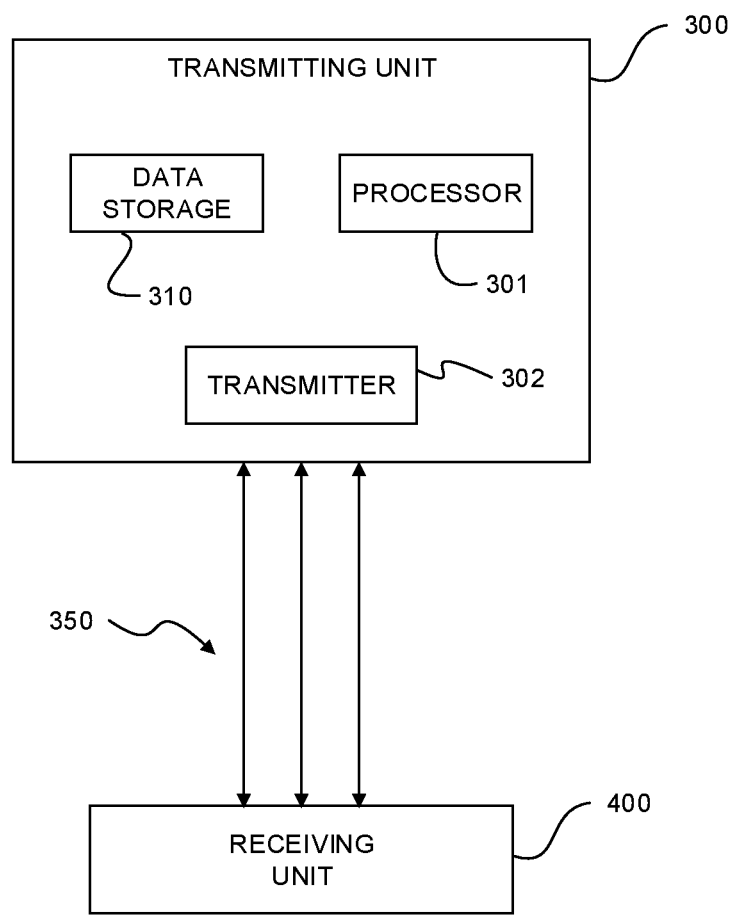
FIG. 3 shows the setup of an embodiment of a transmitting unit.

FIG. 3 shows, by way of example, the setup of an embodiment of a transmitting unit 300 for the transmission of data via an ICL 350 to a receiving unit 400. The transmitting unit 300 has a processor 301. The transmitting unit 300 also has an integrated data storage 310. The processor 301 is configured to identify data to be transmitted in a memory cell of the data storage 310. The processor 301 is further configured to extract the address of the memory cell and the data word from the identified data. Further, the processor 301 is configured to calculate a CRC from the extracted address of the memory cell and the extracted data word. The processor 301 is further configured to generate a data packet to be sent by appending a start frame delimiter and a stop frame delimiter to the extracted address of the memory cell, the extracted data word, and the calculated CRC. The transmitting unit 300 further comprises a transmitter 302 configured to transmit the generated data packet to the receiving unit. The processor 301 is coupled to the transmitter 302 and the data storage 310 via a data line.

Figure 4:
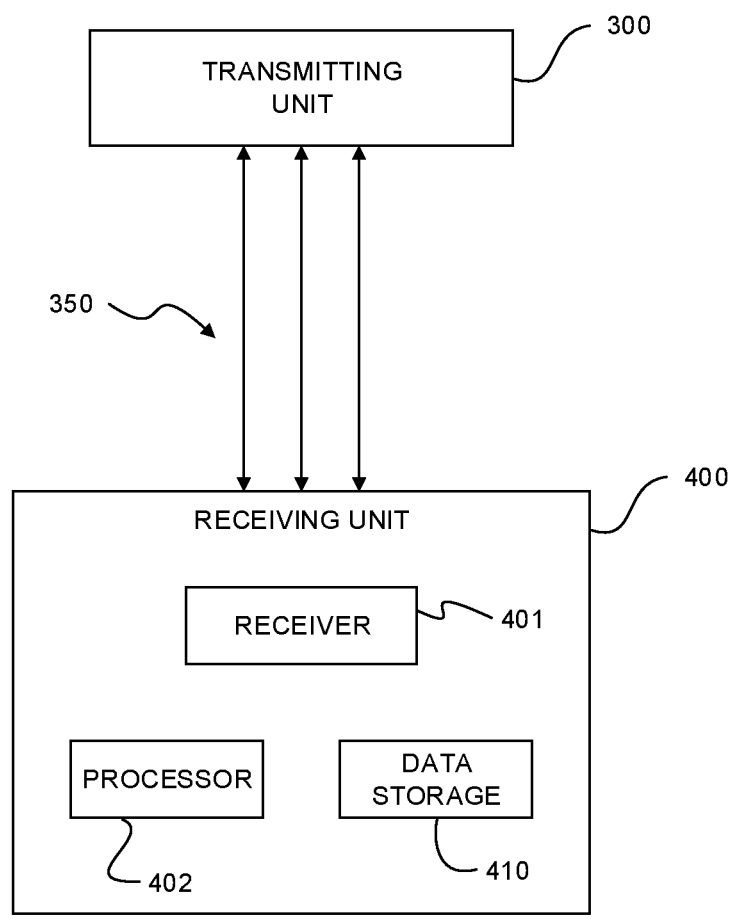
FIG. 4 shows the setup of an embodiment of a receiving unit.

FIG. 4 shows, by way of example, a setup of an embodiment of a receiving unit 400 for receiving data via an ICL 350 from a transmitting unit 300. The receiving unit 400 has a receiver 401. The receiver 401 is configured to receive a data packet. The receiving unit 400 includes a processor 402, which is configured to check the validity of the received packet based on the length between a start frame delimiter and a stop frame delimiter of the data packet. The processor 402 is further configured to extract a CRC, an address of a memory cell, and a data word from the received data packet. The processor 402 is further configured to calculate a CRC from the extracted address of a memory cell and the extracted data word. The processor 402 is further configured to compare the calculated CRC to the extracted CRC. In the illustrated embodiment, the receiving unit 400 further comprises a data storage 410. The processor 402 is further configured to write the extracted data word to the extracted address of the memory cell in a data storage 410 if the calculated CRC matches the extracted CRC. The processor 402 is coupled to the receiver 401 and the data storage 410 via a data line.

Figure 5:
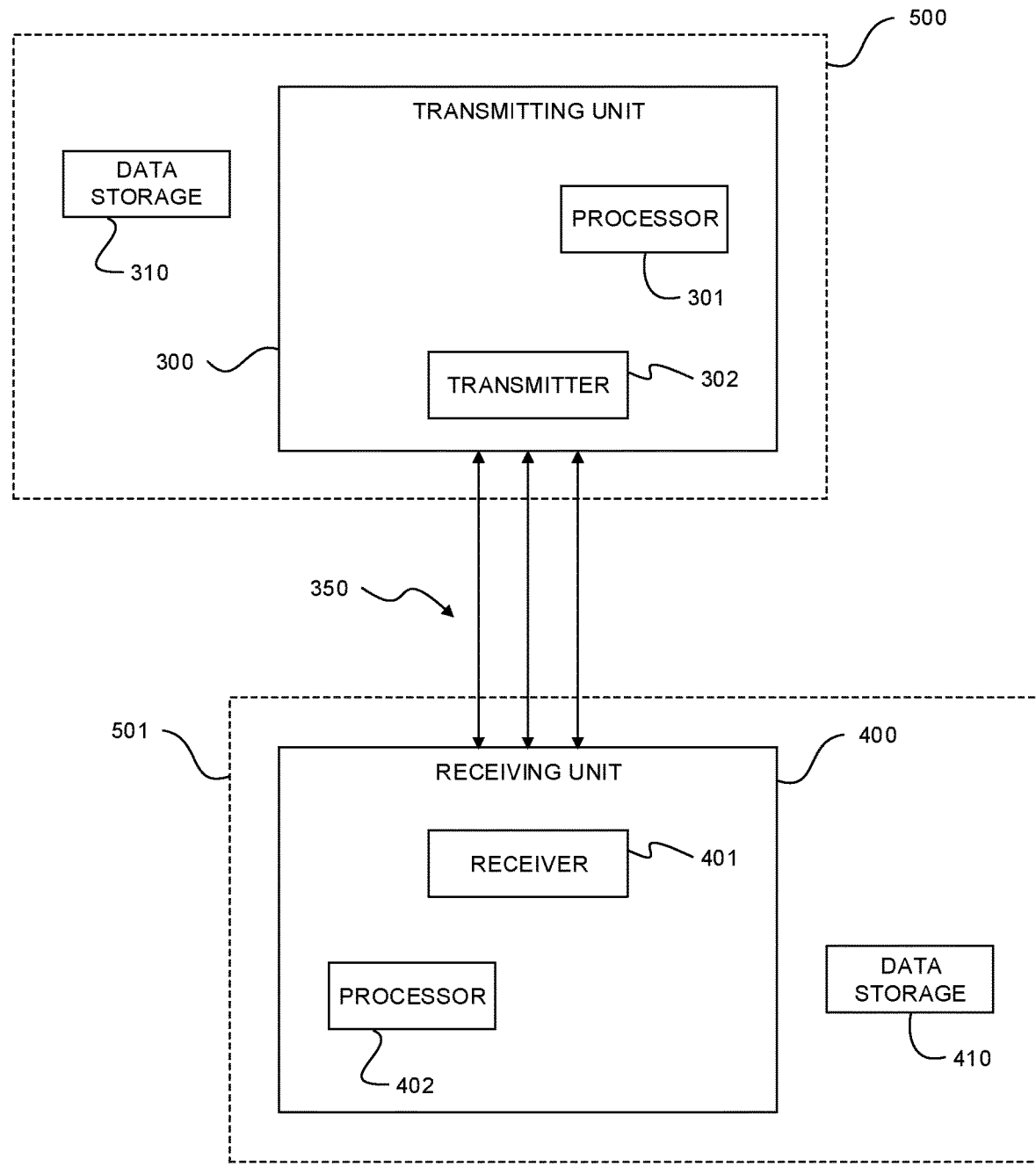
FIG. 5 shows the setup of an embodiment of a computer system.

FIG. 5 shows, by way of example, the setup of an embodiment of a computer system 500. In the illustrated embodiment, the computer system 500 comprises a transmitting unit 300, as shown and described, for example, in FIG. 3. Via the transmitting unit 300, the computer system 500 is connected to a further computer system 501 in the illustrated embodiment. In the illustrated embodiment, the further computer system 501 comprises a receiving unit 400, as shown and described, for example, in FIG. 4.

In the embodiment shown in FIG. 5, the first computer system 500 and the second computer system 501 each comprise a data storage 310 or 410 which are not arranged in the transmitting unit 300 or the receiving unit 400. Alternatively, the data storages 310 and 410 can also be integrated in the transmitting unit 300 or the receiving unit 400, as shown and described in FIGS. 3 and 4.

In a further non-illustrated embodiment, the first computer system 500 and/or the second computer system 501 may comprise further transmitting units 300 or receiving units 400.

In a further non-illustrated embodiment, the transmitting unit 300 and the receiving unit 400 can each be designed as a combined transmitting and receiving unit (transceiver) so that data can be transmitted in both directions between the first computer system 500 and the second computer system 501. In this case, the transmitting unit 300 and the receiving unit 400 can be integrated in a common component or can also be implemented by two separate components. For example, the first computer system 500 may additionally comprise a receiving unit 400 for receiving data from the second computer system 501 or one or more further computer systems. The second computer system 501 may, for example, additionally comprise one or more transmitting units 300 for transmitting data to the first computer system 500 or to one or more further computer systems.

In the illustrated embodiment, the transfer of the data between the first computer system 500 and the second computer system 501 takes place via an electrical signal line 550. The signal line 550 comprises several connections via which the data can be transmitted in parallel between the computer system 500 and the second computer system 501. In a further non-illustrated embodiment, the transmission of the data between the first computer system 500 and the second computer system 501 can also take place alternatively via an optical signal line or via a plurality of parallel optical signal lines.

Figure 6:
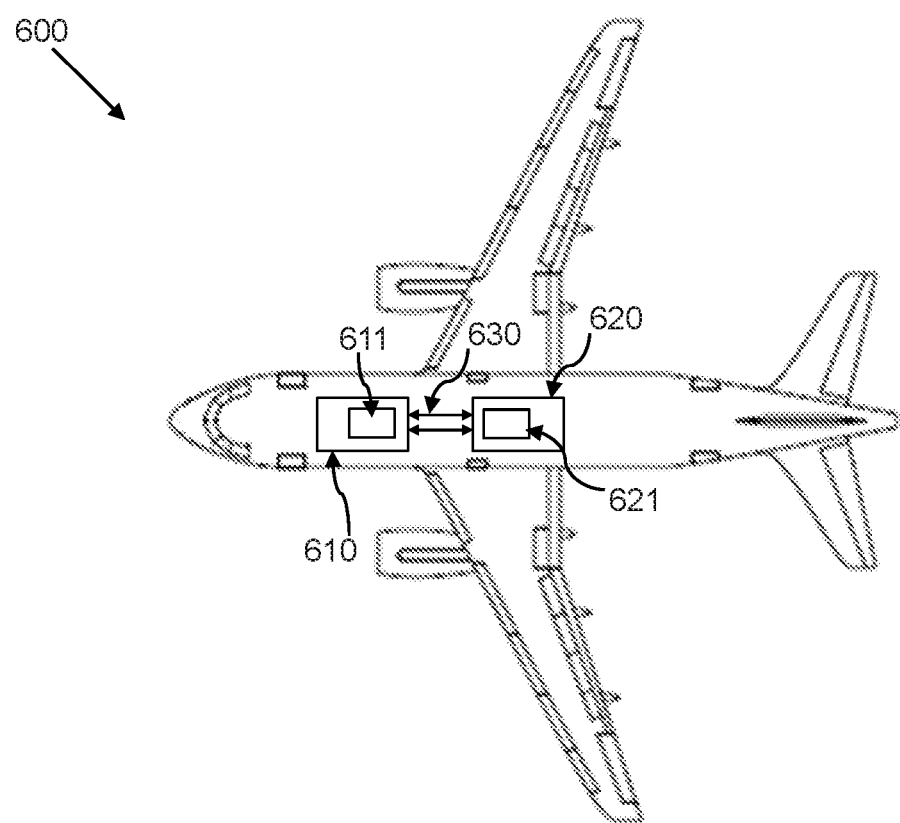
FIG. 6 shows an embodiment of an aircraft with a first and a second computing unit.

FIG. 6 shows, by way of example, an embodiment of an aircraft 600 with a first 601 and a second computing unit 602.

The aircraft 600 comprises a first computing unit 610 which has a transmitting unit 611, as described and shown, for example, in FIG. 3. The aircraft 600 comprises a second computing unit 620 which has a receiving unit 621, as shown and described, for example, in FIG. 4. The aircraft 600 further comprises a data network 630. The first computing unit 610 and the second computing unit 620 are connected to one another via the data network 630. The transmitting unit 611 of the first computing unit 610 is adapted to transmit data via the data network 630 to the receiving unit 621 of the second computing unit 620.

Although embodiments of the invention have been particularly shown and described with reference to specific embodiments, it should be understood by those skilled in the art that numerous changes in design and details may be made therein without departing from the spirit and scope of the invention as defined by the appended claims. The scope of the invention is thus defined by the appended claims, and it is therefore intended that all changes which fall within the wording or the equivalence range of the claims are encompassed.

LIST OF REFERENCE NUMERALS

100 Method
101-105 Steps of the method 100
200 Method
201-206 Steps of the method 200
300 Transmitting unit
301 Processor
302 Transmitter
310 Data storage
350 Data connection
400 Receiving unit
401 Receiver
402 Processor
410 Data storage
500 First computing unit
501 Second computing unit
600 Aircraft
610 First computing unit
611 Transmitting unit
620 Second computing unit
621 Receiving unit
630 Data connection

What is claimed is:

1. A method for the transmission of data via an Inter Communication Link (ICL) to a receiving unit, comprising the steps of:
identifying data stored in a memory cell of a data storage of a transmitting unit, the identified data to be transmitted;
extracting an address of the memory cell of the transmitting unit and extracting a data word from the identified data;
calculating a cyclic redundancy check (CRC) checksum from the extracted address of the memory cell of the transmitting unit and from the extracted data word;
generating a data packet to be sent by appending a start frame delimiter and a stop frame delimiter to the extracted address of the memory cell of the transmitting unit, the extracted data word, and the calculated CRC checksum; and
sending the data packet.

2. The method according to claim 1, wherein a logical value "1" is transmitted continuously as long as no data packet is sent.

3. The method according to claim 1, wherein the start frame delimiter comprises a sequence of three Manchester II code values of "1".

4. The method according to claim 1, wherein the logical value "1" is transmitted during a sequential transmission of data packets between the stop frame delimiter of the first data packet and the start frame delimiter of the subsequent data packet.

5. The method according to claim 1, wherein the data packets are transmitted using a Manchester II code.

6. The method according to claim 1, wherein the stop frame delimiter comprises a sequence of three Manchester II code values of the value "0".

7. The method according to claim 6, wherein the start frame delimiter comprises a sequence of three Manchester II code values of the value "1".

8. A method for receiving data via an Inter Communication Link (ICL) from a transmitting unit, comprising the steps of:
    receiving a data packet;
    checking validity of the received packet based on a data length between a start frame delimiter and a stop frame delimiter of the data packet;
    extracting a first cyclic redundancy check (CRC) checksum, an address of a memory cell of the transmitting unit, and a data word from the data packet;
    calculating a second CRC checksum from the extracted address of the memory cell of the transmitting unit and from the extracted data word;
    comparing the calculated second CRC checksum with the extracted first CRC checksum; and
    writing the extracted data word to a write address of a memory cell of the receiving unit when the calculated second CRC checksum matches the extracted first CRC checksum, wherein the write address is identical to the address of the memory cell of the transmitting unit.

9. The method of claim 8, wherein the extracted data word is discarded when the calculated second CRC checksum does not match the extracted first CRC checksum.

10. The method of claim 9, wherein an error counter is incremented when the calculated second CRC checksum does not match the extracted first CRC checksum.

11. A transmitting unit for the transmission of data via an Inter Communication Link (ICL) to a receiving unit, the transmitting unit comprising:
    a processor configured to identify data stored in a memory cell of a data storage, the identified data to be transmitted;
    wherein the processor is further configured to extract an address of the memory cell and a data word from the identified data;
    wherein the processor is further configured to calculate a cyclic redundancy check (CRC) from the extracted address of the memory cell and the extracted data word;
    wherein the processor is further configured to generate a data packet to be sent by appending a start frame delimiter and a stop frame delimiter to the extracted address of the memory cell, the extracted data word, and the calculated CRC; and
    a transmitter configured to send the data packet.

12. A receiving unit for receiving data via an Inter Communication Link (ICL) from a transmitting unit, the receiving unit comprising:
    a receiver configured to receive a data packet; and
    a processor configured to check validity of the received packet based on a data length between a start frame delimiter and a stop frame delimiter of the data packet;
    wherein the processor is further configured to extract a first cyclic redundancy check (CRC), an address of a memory cell of the transmitting unit, and a data word from the data packet;
    wherein the processor is further configured to calculate a second CRC from the extracted address of the memory cell of the transmitting unit and from the extracted data word;
    wherein the processor is further configured to compare the calculated second CRC to the extracted first CRC; and
    wherein the processor is further configured to write the extracted data word to a write address of a memory cell of the receiving unit when the calculated second CRC matches the extracted first CRC, wherein the write address is identical to the address of the memory cell of the transmitting unit.

13. A computer system comprising a transmitting unit to connect the computer system to at least one further computer system, the transmitting unit configured to transmit data via an Inter Communication Link (ICL), and the transmitting unit comprising:
    a processor configured to identify stored in a memory cell of a data storage of the transmitting unit, the identified data to be transmitted;
    wherein the processor is further configured to extract an address of the memory cell of the transmitting unit and a data word from the identified data;
    wherein the processor is further configured to calculate a cyclic redundancy check (CRC) from the extracted address of the memory cell of the transmitting unit and the extracted data word;
    wherein the processor is further configured to generate a data packet to be sent by appending a start frame delimiter and a stop frame delimiter to the extracted address of the memory cell of the transmitting unit, the extracted data word, and the calculated CRC; and
    a transmitter configured to send the data packet.

14. The computer system according to claim 13, further comprising a receiving unit configured to receive data via the ICL, the receiving unit comprising:
    a receiver configured to receive the data packet; and
    a processor configured to check validity of the received packet based on a data length between the start frame delimiter and the stop frame delimiter of the data packet;
    wherein the processor of the receiving unit is further configured to extract the calculated CRC, the address of the memory cell of the transmitting unit, and the data word from the data packet;
    wherein the processor of the receiving unit is further configured to calculate a second CRC from the extracted address of the memory cell of the transmitting unit and from the extracted data word;
    wherein the processor of the receiving unit is further configured to compare the calculated second CRC to the extracted calculated CRC; and
    wherein the processor of the receiving unit is further configured to write the extracted data word to a write address of a memory cell of the receiving unit when the calculated second CRC matches the extracted calculated CRC, wherein the write address is identical to the address of the memory cell of the transmitting unit.

15. The computer system according to claim 13, wherein communication with the second computer system is carried out via an optical or electrical signal line.

16. An aircraft comprising:
- a first computing unit comprising a transmitting unit configured to transmit data via an Inter Communication Link (ICL), the transmitting unit comprising:
  - a processor configured to identify data stored in a memory cell of a data storage of the transmitting unit, the identified data to be transmitted;
  - wherein the processor is further configured to extract an address of the memory cell of the transmitting unit and a data word from the identified data;
  - wherein the processor is further configured to calculate a cyclic redundancy check (CRC) from the extracted address of the memory cell of the transmitting unit and the extracted data word;
  - wherein the processor is further configured to generate a data packet to be sent by appending a start frame delimiter and a stop frame delimiter to the extracted address of the memory cell of the transmitting unit, the extracted data word, and the calculated CRC; and
  - a transmitter configured to send the data packet;
- a second computing unit comprising a receiving unit configured to receive data via the ICL, the receiving unit comprising:
  - a receiver configured to receive the data packet; and
  - a processor configured to check validity of the received packet based on a data length between the start frame delimiter and the stop frame delimiter of the data packet;
  - wherein the processor of the receiving unit is further configured to extract the calculated CRC, the address of the memory cell of the transmitting unit, and the data word from the data packet;
  - wherein the processor of the receiving unit is further configured to calculate a second CRC from the extracted address of the memory cell of the transmitting unit and from the extracted data word;
  - wherein the processor of the receiving unit is further configured to compare the calculated second CRC to the extracted calculated CRC; and
  - wherein the processor of the receiving unit is further configured to write the extracted data word to a write address of a memory cell of the receiving unit when the calculated second CRC matches the extracted calculated CRC, wherein the write address is identical to the address of the memory cell of the transmitting unit; and
- a data network;
- wherein the transmitting unit of the first computing unit is configured to transmit data via the data network to the receiving unit of the second computing unit.

* * * * *